United States Patent

[11] 3,610,437

[72] Inventors Vladimir Vasilievich Barakov
ulitsa Stalevarov, 8-a, kv. 11, Elektrostal;
Alexandr Alexandrovich Sukhanov,
prospekt Lenina, 10-a, kv. 67, Elektrostal;
Anatoly Sergeevich Tyrtov, Noginsky raion,
de revnya Babeeva, 14, Moskovskaya
oblast, all of U.S.S.R.
[21] Appl. No. 3,315
[22] Filed Jan. 16, 1970
[45] Patented Oct. 5, 1971
[32] Priority Apr. 7, 1969
[33] U.S.S.R.
[31] 1,318,079

[54] DEVICE FOR TUBE TRANSFER IN TUBE-ROLLING MILL
1 Claim, 3 Drawing Figs.

[52] U.S. Cl. .................................................. 214/1 P,
193/211
[51] Int. Cl. ...................................................... B65g 29/00

[50] Field of Search .......................................... 198/209,
211; 214/1 P, 1

[56] References Cited
UNITED STATES PATENTS
2,856,895 10/1958 Anderson et al ............. 214/1 P2 X Primary Examiner—Gerald M. Forlenza
Assistant Examiner—Frank E. Werner
Attorney—Waters, Roditi, Schwartz & Nissen ABSTRACT: A device for tube transfer in a tube-rolling mill from the roller table to a continuously transporting mechanism, in which the working member is essentially a drum having longitudinal grooves for tubes and provided with guides which, due to the fact that their position can be controlled with respect to the height, make it possible to control the height form which tubes fall from the drum down onto the transporting mechanism.

PATENTED OCT 5 1971 3,610,437

DEVICE FOR TUBE TRANSFER IN TUBE-ROLLING MILL

The present invention relates to devices used for the transfer of tubes in tube-rolling mills from the roller tables to a continuous transporting mechanism which is, as a rule, of a screw type.

Known in the art are devices for tube transfer in tube-rolling mills, comprising a drum having longitudinal grooves for tubes and guides suspended to an upright and disposed adjacent to the cylindrical surface of the drum at the side of the transporting mechanism. These drums are used to provide for the removal of tubes from the drum in a certain order (cf. the device according to the U.S.S.R. Inventor's Certificate No; 116,451; Cl. 7a, 2602).

The main disadvantage of these devices lies in that the guides of the drum are made so that it is impossible to control their position with respect to their height.

Since the position of the guides of the drum is preset so as to let through tubes of the greatest diameter, the smaller is the diameter of a tube, the greater is the height from which it falls down. As the thickness of the walls of the tubes, having a small diameter, is small and the tubes are considerably curved along their length, they are deformed and their surface is damaged when falling down from a great height this being particularly true about hot tubes. Besides, when falling down from a great height, tubes which are considerably curved along their length, get into different turns of the screw of the transporting mechanism and, therefore, are entangled, which hampers the automation of the subsequent operations.

Also known in the art are drum-type devices used in rolling mills to transfer profiled rolled stock, wherein the drum is provided with inclined guides transferring the rolled stock directly from the drum to the transporting mechanism (cf. FRG Pat. No. 1081403, cl. 7a, 20₀2).

Such devices can hardly be used in tube-rolling mills, as, when rolling down along inclined guides, they can form piles on the transporting mechanism due to excessive acceleration.

In case they are greatly curved, the tubes slide down in such a way that one end of the tube has already slid down, whereas the other one still stays in the zone of operation of the drum teeth and is gripped thereby. This may cause tube breaking, twisting of the drum shaft, etc.

It is an object of the present invention to eliminate the above-mentioned disadvantages of the known devices used for tube transfer.

The present invention has as its task the provision of such a device for tube transfer from the roller table to the transporting mechanism, which would ensure to place every tube in a certain order along its whole length owing to improvements made in the guides.

This object is accomplished by that in the device for tube transfer, which is essentially a drum with longitudinal grooves for tubes, provided with guides disposed adjacent the cylindrical surface of the drum and serving to provide for the removal of tubes off the drum in a certain order, according to the invention, said guides are equipped with slidable arc-shaped shields embracing the portion of the drum cylindrical surface disposed below the axis of its rotation.

The following detailed description of an exemplary embodiment of the present invention is given with reference to the accompanying drawings, in which.

Figure 1:
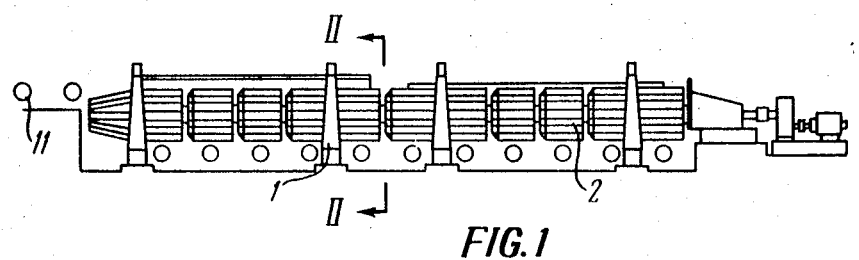
FIG. 1 is a side view of the device for tube transfer built in accordance with the present invention.
Figure 2:
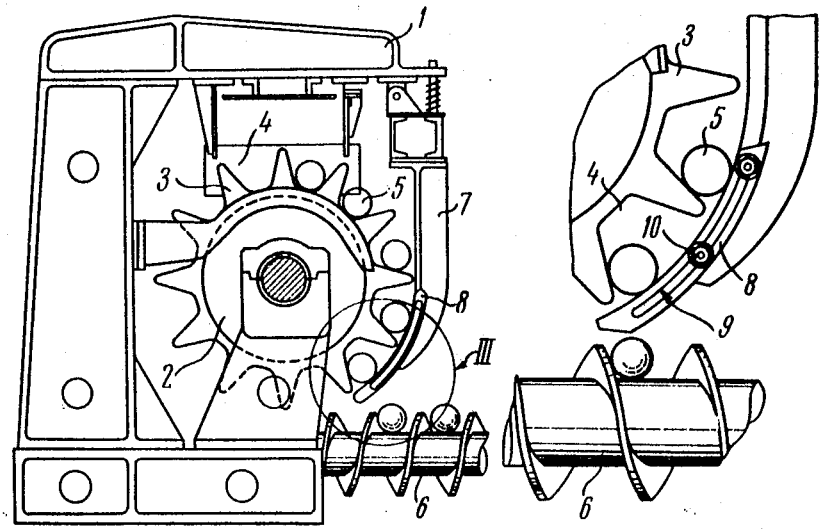
FIG. 2 is an enlarged view of the same device, a section being taken along line II—II of FIG. 1.
Figure 3:
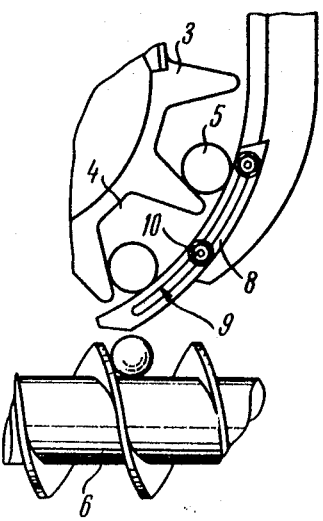
FIG. 3 is an enlarged view of assembly III of the device shown in FIG. 2.

The device for tube transfer comprises a frame 1 mounting a multisectional drum 2 (FIGS. 1, 2) which has teeth 3 (FIGS. 2, 3) forming longitudinal grooves 4 for tubes 5 on the cylindrical surface of the drum 1. Suspended to the frame 1 as the side of a continuous transporting mechanism 6 are guides 7 having slidable arc-shaped shields 8 which embrace a portion of the cylindrical surface of the drum 2 disposed below the axis of its rotation.

The shields 8 are provided with slots 9 (FIGS. 3) owing to which fact they may be extended to various levels. The shield is fixed in its positions by means of bolts 10 passing through the slots 9 and further into holes made in the guides 7.

Prior to operation the position of the shield 8 is adjusted with respect to its height so as to minimize the height from which tubes of one and the same diameter are to fall down.

For this purpose the distance along the height between lower portion of the shield 8 and the inner diameter of the screw should not practically exceed the diameter of the tube, provided the shield does not touch the screw crest.

From the roller table 11 (FIG. 1) tubes are continuously one after another delivered into the grooves 4 of the rotatory drum 2 mounted below the roller table 11, and are braked by friction forces until they are completely stopped. The rate of rotation of the drum 2 is controlled so that during the period of time required for a new tube to be delivered to the drum, the latter turns through an angle corresponding to one groove of the drum.

Due to this fact the tubes 5 moving one after another along the roller table 11 get into different grooves 4. In the course of rotation of the drum 2 and the tubes are prevented from premature falling out from the grooves 4 by the guides 7 having the shields 8.

After the tube 5 disposed in the groove 4 of the drum 4 has left the zone of action of the shield 8, it falls into a turn of the screw of the transporting mechanism 6 under the action of gravity forces, the screw rotating continuously to free the place for the next tube.

What we claim is:

1. A device for tube transfer in a tube-rolling mill from the roller table to a continuously transporting mechanism, comprising a drum with longitudinal grooves for tubes, said grooves being made on the outer surface thereof; guides disposed near the cylindrical surface of said drum and used to provide for the removal of the tubes in a certain order; arc-shaped slidable shields provided on said guides and embracing the portion of the drum cylindrical surface disposed below the axis of the drum rotation.